United States Patent
Santa et al.

(10) Patent No.: US 6,256,502 B1
(45) Date of Patent: Jul. 3, 2001

(54) WIDEBAND MULTICARRIER POWER CONTROL FOR A CELLULAR PCS BASESTATION TRANMITTER

(75) Inventors: Ryan R. Santa, Nepean; Blaine Q. Geddes, Kemptville, both of (CA)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/219,793

(22) Filed: Dec. 23, 1998

(51) Int. Cl.$^7$ ....................................................... H04Q 7/20
(52) U.S. Cl. .................... 455/442; 455/103; 455/561; 370/335
(58) Field of Search .................................. 455/103, 522, 455/561, 205, 200, 442, 443, 56; 375/205, 200; 370/335, 336, 480; 341/139

(56) References Cited

U.S. PATENT DOCUMENTS

| | | | |
|---|---|---|---|
| 5,101,501 | * 3/1992 | Gilhousen | 455/33 |
| 5,485,486 | * 1/1996 | Gilhousen | 375/205 |
| 5,778,307 | * 7/1998 | Budnik | 455/103 |
| 5,870,425 | * 2/1999 | Piaget | 375/200 |

\* cited by examiner

*Primary Examiner*—Nguyen T. Vo
*Assistant Examiner*—John J Lee
(74) *Attorney, Agent, or Firm*—Foley & Lardner

(57) ABSTRACT

An apparatus and method for power control in a cellular basestation transmitter with multiple digital carrier channels. Each digital carrier signal is attenuated by a digital power control circuit under the control of a microcontroller, the amount of attenuation varying according to the number of active channels. The attenuated digital signals are combined and converted to an analog signal by a digital to analog converter, and the analog signal is amplified by an analog power control circuit also under control of the microcontroller. The combined digital signal may be clipped to reduce the signal peaks, the amount of clipping varying according to the number of active channels.

20 Claims, 4 Drawing Sheets

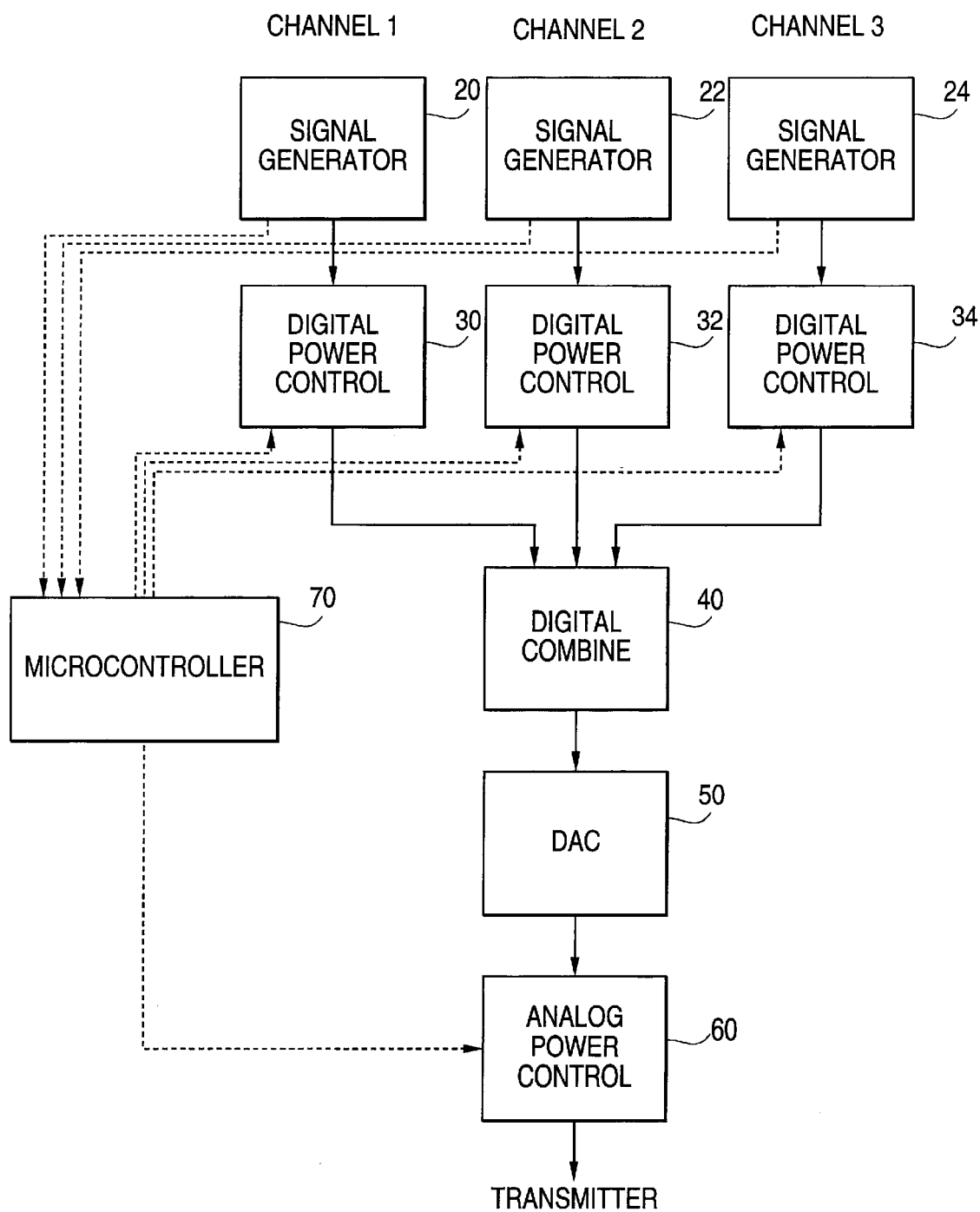

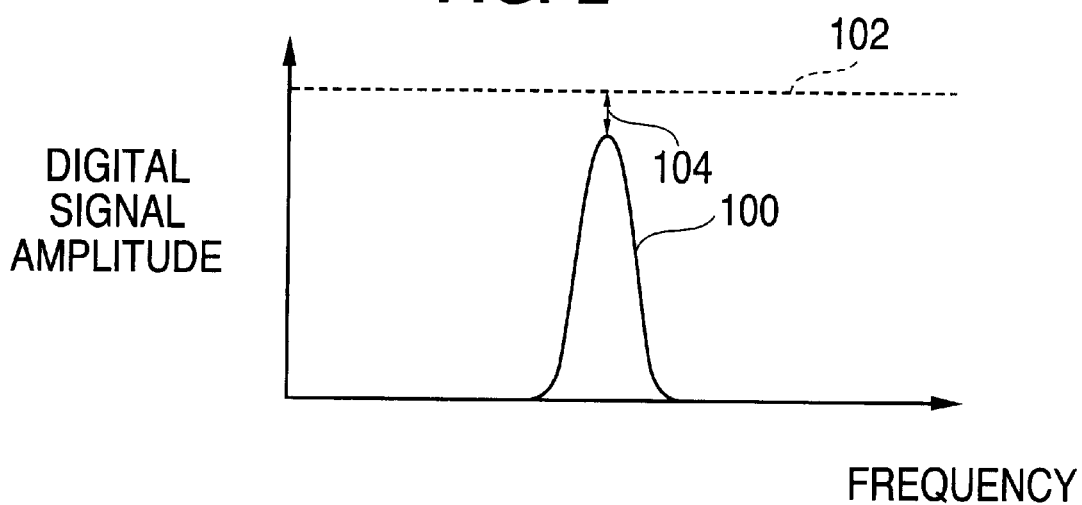
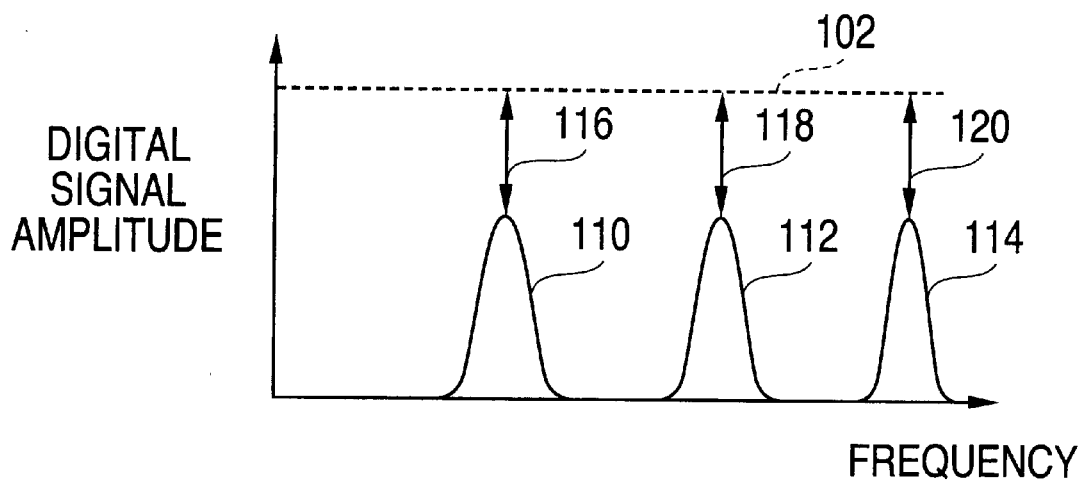

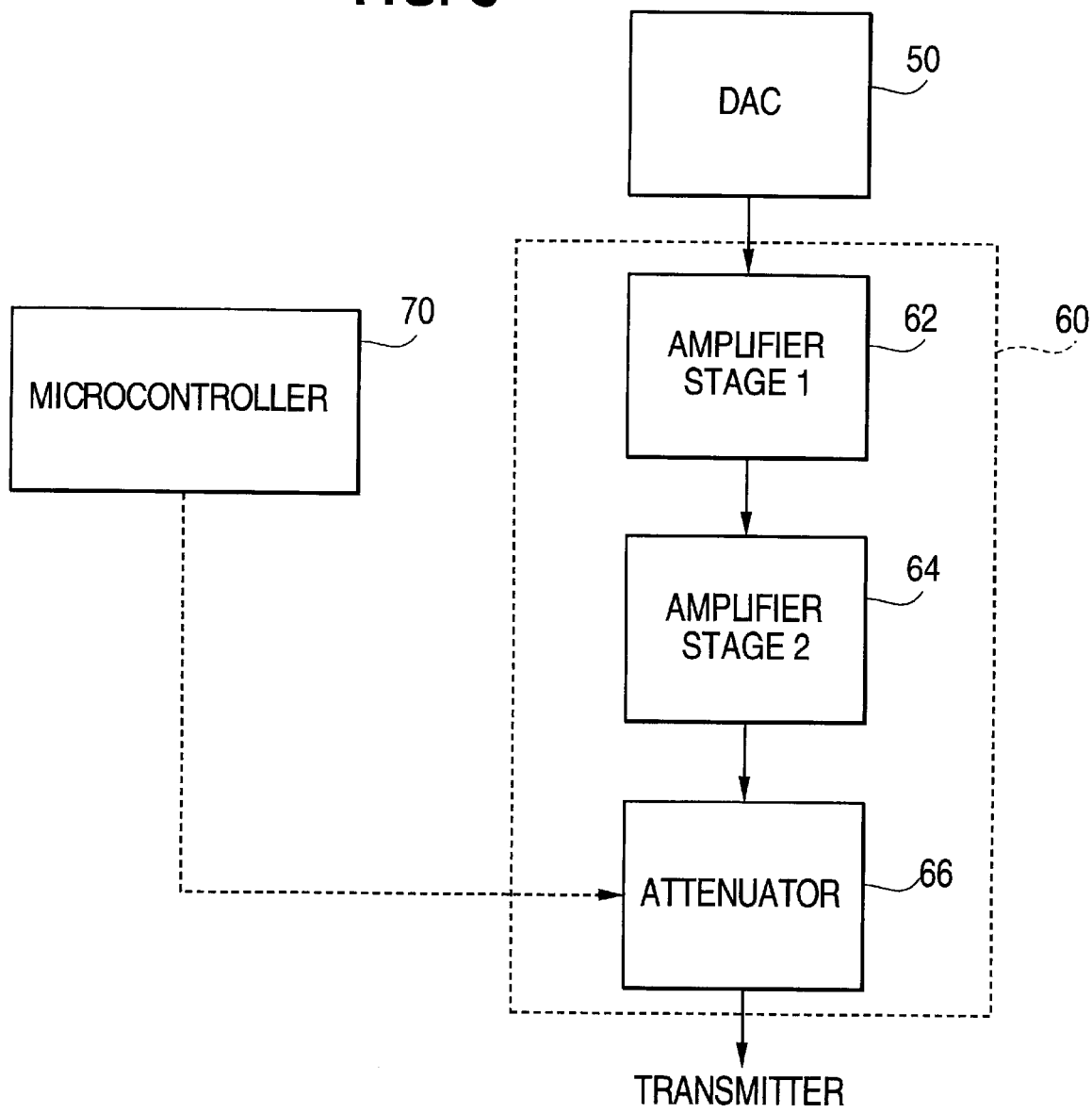

WIDEBAND MULTICARRIER POWER CONTROL FOR A CELLULAR PCS BASESTATION TRANMITTER

BACKGROUND OF THE INVENTION

1. Field of the Invention

The invention relates generally to an apparatus and method for power control in a digital to analog converter (DAC) with multiple digital input channels and, more particularly, to power control in a wideband multicarrier cellular PCS basestation transmitter.

2. Description of the Related Art

A digital to analog converter (DAC) is used in cellular basestations to convert a digital carrier signal into an analog signal for transmission by the basestation transmitter. In previous designs, one DAC is provided for each digital carrier signal. In such systems, the amplitude of the input signal to the DAC must be maintained between certain limits to ensure acceptable operation of the DAC in order to meet emissions requirements specified by the applicable wireless standards.

If the amplitude of the digital signal exceeds the full scale of the DAC, the amplitude peaks of the digital signal will not be reproduced in the analog output of the DAC signal resulting in the analog signal being "clipped." This clipping by the DAC results in undesirable high frequency noise being added to the analog signal, which results in undesirable emissions being produced by the transmitter. However, if the amplitude of the digital signal is too small, the accuracy of the DAC is reduced and the signal-to-noise ratio in the DAC may be reduced to the extent that the low-level noise produced by the DAC may become a significant problem.

Thus, optimum amplitude for the digital carrier signal input to the DAC is when there is a small "backoff" such that the peak amplitude of the digital signal is slightly less than the full scale of the DAC. The amplitude of the analog signal output from the DAC is then adjusted by an analog power control circuit in order to control the output power of transmitted signal. Thus, with a single digital carrier signal input to the DAC, the optimum arrangement is have the peak amplitude of the digital signal at close to the full-scale of the DAC and to control the output power of the system by adjusting the amplitude of the analog signal output from the DAC. This prevents clipping of the signal in the DAC, thereby preventing excessive emissions, while maintaining the digital signal at a sufficiently high level to prevent noise problems in the DAC, and providing control of the output power of the system.

In basestation systems having multiple digital carrier signals, previous designs have provided multiple DACs, one for each carrier signal. This approach has been necessitated by the problems inherent in combining multiple carrier signals. Each carrier signal has a different center frequency. When the carrier signals are combined, the resultant signal will include very high peaks at those points where the peaks of the individual signals coincide. The combined digital signal will thus appear very "peaky" and have a higher peak/RMS ratio than the each of the individual signals. Furthermore, the peak/RMS ratio will increase as a greater number of individual signals are combined.

If only one DAC is used in the basestation system, the DAC receiving a combined digital signal and converting it to an analog signal, then the DAC must be designed to handle the peak amplitude of the combined digital signal, or the combined digital signal must be attenuated. Increasing the resolution of the DAC (i.e. increasing the full scale value of the DAC) would greatly increase the cost and complexity of the system. The other option is reducing the amplitude of the combined digital signal (or reducing the amplitude of each individual digital signal) so that the signal peaks do not exceed the full scale of the DAC. However, as the amplitude of the combined digital signal is reduced, the accuracy of the DAC is reduced, the signal-to-noise ratio is reduced, and the output power of the system is reduced. As the amplitude of the combined digital signal is further reduced, the noise introduced by the DAC can become very significant in comparison to each individual signal in the combined digital signal.

The present invention is directed to overcoming or at least reducing the effects of one or more of the problems set forth above.

SUMMARY OF THE INVENTION

The present invention provides for a wideband transmitter capable of transmitting multiple carriers simultaneously. The system accommodates multiple channels of digital carrier signals with a single DAC, and provides for power control of the individual digital carrier signals, combination of the individual digital signals into a single combined digital signal before the DAC, and power control of the analog signal after the DAC. This enables control of the output power of each individual carrier by modifying the amplitude of each carrier signal digitally, so that each carrier can have a different power level.

The output power of the analog signal can also be controlled, affecting the power level of all of the carriers equally. Furthermore, the power control of the carrier signals is dependent on the number of active carriers in the system, enabling the DAC to be operated at the minimum backoff for every operating situation. This prevents clipping by the DAC while operating the DAC as close to full scale as possible to reduce problems caused by noise introduced by the system.

The combined digital signal may also be clipped digitally (before the DAC) to reduce the peaks in the combined digital signal before input to the DAC. This clipping enables the DAC to be operated with less backoff, further improving the performance of the transmitter. The amount of clipping may also be varied depending on the number of active carriers in the transmitter, enabling the DAC to be operated at the minimum backoff for every operating situation.

In accordance with one aspect of the invention, the invention includes an apparatus for combining two or more digital signals into one analog signal comprising two or more digital power control circuits, a digital combiner circuit, a digital to analog converter, an analog power control circuit, and a microcontroller. Each digital power control circuit receives one of the digital signals and adjusts its amplitude to produce an adjusted digital signal. The combiner circuit receives the adjusted digital signals and combines them into a combined digital signal. The digital to analog converter receives the combined digital signal and converts the combined digital signal into an analog signal. The analog power control circuit receives the analog signal from the digital to analog converter and adjusts its amplitude. The microcontroller is connected to the digital power control circuits and the analog power control circuit for controlling the adjustment of the amplitude of the digital signals and the analog signal.

The digital power control circuits may comprise a multiply circuit which receives a first adjustment value from the microcontroller and multiplies the digital signal received by the digital power control circuit and the first adjustment value to produce the adjusted digital signal. The first adjustment values may vary according to the number of the digital signals received by the apparatus.

In accordance with another aspect of the invention, the combining circuit comprises a circuit for clipping the combined digital signal. The clipping circuit may comprise a compare circuit for comparing the combined digital signal to a reference value and limiting the amplitude of the combined digital signal if the amplitude of the combined digital signal exceeds the reference value. The reference value may vary according to the number of the digital signals received by the apparatus.

In accordance with yet another aspect of the invention, the invention includes a method for combining two or more digital signals into one analog signal. The method comprises processing the digital signals to adjust the amplitude of at least one of the digital signals according to a first adjustment value, combining the processed digital signals into a combined digital signal, converting the combined digital signal into an analog signal, the analog signal having an amplitude, and adjusting the amplitude of the analog signal according to a second adjustment value. The first adjustment values may vary according to the number of digital signals being combined. Furthermore, the processing step may comprise multiplying the digital signals and the first adjustment value to produce the adjustment to the amplitude of at least one of the digital signals.

In accordance with another aspect of the invention, the method further comprises a clipping step after the combining step and before the converting step, the clipping step comprising comparing the combined digital signal to a reference value and limiting the amplitude of the combined digital signal if the amplitude of the combined digital signal exceeds the reference value. The first adjustment values and the reference value may vary according to the number of digital signals being combined.

BRIEF DESCRIPTION OF THE DRAWINGS

The features and advantages of the invention will become apparent upon reference to the following detailed description and the accompanying drawings, of which:

FIG. 1 is a block diagram of an embodiment of the invention;

FIG. 2 is a diagram showing power control according to the present invention for a single digital signal;

FIG. 3 is a diagram showing power control for according to the present invention three digital signals;

FIG. 5 is a block diagram of showing details of the analog power control of the embodiment of FIG. 1.

Figure 4:
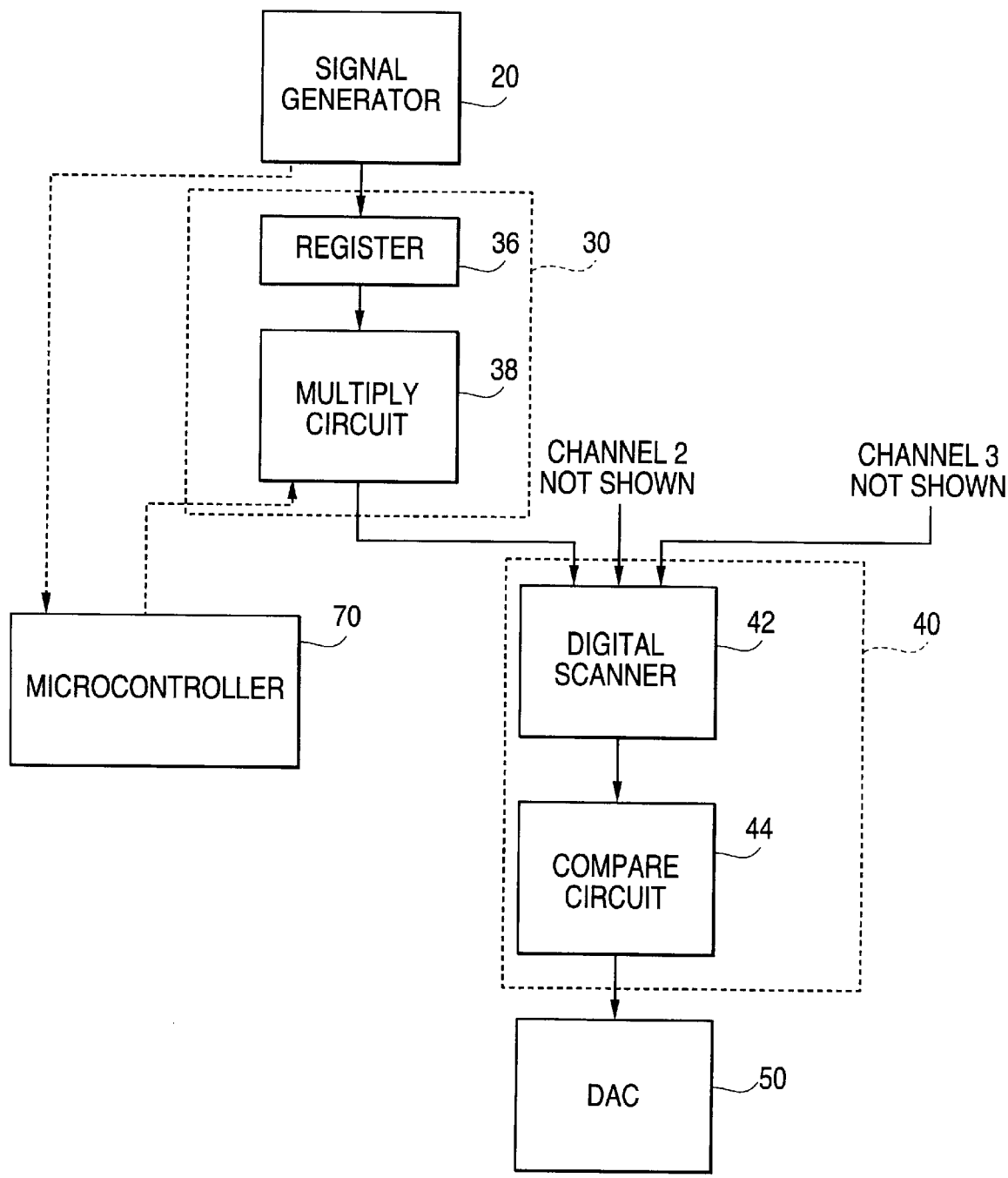
FIG. 4 is a block diagram showing details of the digital power control of the embodiment of FIG. 1.

While the invention is susceptible to various modifications and alternative forms, specific embodiments have been shown by way of example in the drawings and will be described in detail herein. However, it should be understood that the invention is not limited to the particular forms disclosed. Rather, the invention covers all modifications, equivalents, and alternatives falling within the spirit and scope of the invention as defined in the appended claims.

DETAILED DESCRIPTION OF SPECIFIC EMBODIMENTS

Turning now to the drawings and referring initially to FIG. 1, a block diagram of one embodiment of the invention is shown. The diagram shows a transmitter system in which multiple digital signals are generated on separate channels for input to a digital to analog converter (DAC) 50. Digital power control circuits 30, 32, and 34 adjust the amplitude of the digital signals before input to the DAC 50 to drive the DAC as close to full-scale as possible without clipping the signal. Analog power control circuit 60 adjusts the amplitude of the analog output from the DAC 50 to produce a signal at the transmitter with sufficient power for transmission. Microcontroller 70 controls the power control circuits to achieve the optimum operation of the DAC (i.e. as close to full-scale as possible without clipping the signal) for the number of channels active at any given time.

A digital signal is generated by signal generator 20, and input to digital power control circuit 30. Similarly, signal generators 22 and 24 generate signals which are input to power control circuits 32 and 34. A digital combine circuit 40 receives the outputs from power control circuits 30, 32, and 34, and provides a combined signal to DAC 50. The output from DAC 50 is input to analog power control circuit 60, and the output from analog power control circuit 60 is sent to the basestation transmitter. Microcontroller 70 provides control of the digital power control circuits 30, 32, and 34, and the analog power control circuit 60. Although the system of FIG. 1 is shown having three channels of digital signals, it should be understood that the system described could be applied to systems having any number of channels.

The signal generator 20 generates a digital signal for one channel of the system. For the PCS basestation application, each channel carries a separate carrier signal. Signal generator 20 will may generate digital signals in a parallel or serial format, and may be implemented using an application specific integrated circuit (ASIC) or programmable gate array (PGA), using techniques that are well known in the art. Alternatively, signal generator 20 could be omitted and microcontroller 70 used to generate the digital signal or the digital signal could be generated by a component external to the digital to analog converter.

Digital power control circuit 30 receives the digital signal generated by signal generator 20 and multiplies the digital signal by a digital attenuation value provided by microcontroller 70 to achieve power control of the digital signal. Digital combine circuit 40 combines the outputs from the digital power control circuit for each channel to produce a combined digital signal for input to the DAC 50. This combination of multiple digital signals results in a combined signal with very high peaks at those points where the peaks of the individual signals coincide. This necessitates increasing the digital attenuation value from microcontroller 70 in order to reduce the amplitude of each individual digital signal so that the peaks of the combined digital signal do not exceed the full scale of the DAC 50. As the number of active channels increases, the combined digital signal becomes more "peaky" and the digital attenuation value provided by microcontroller 70 must be further increased. The digital attenuation value is thus dependent upon the number of active channels.

Microcontroller 70 receives an input from each of the signal generators 20, 22, and 24 (or alternatively from the digital power control circuits 30, 32, and 34) from which microcontroller 70 can determine how many of the channels have a signal present (i.e. how many channels are active). As the number of active channels increases, the digital attenuation value generated by microcontroller 70 will increase, causing the digital power control circuits 30, 32, and 34 to reduce the amplitude of the digital signals before input to the digital combine circuit 40 and the DAC 50. Conversely, as the number of active channels decreases, the digital attenuation value generated by microcontroller 70 will decrease. The digital attenuation value is calculated to adjust the amplitude of the digital signals so that the peak amplitude of the combined digital signal at the input to the DAC 50 is close to but does not exceed the full scale of the DAC 50, thus operating the DAC 50 with a minimum "backoff."

The digital attenuation value corresponding to each possible number of active channels may be determined empirically and stored in read-only memory in microcontroller 70 in a look-up table. Microcontroller 70 accesses the look-up table to determine the applicable digital attenuation value for a given number of active channels. Alternatively, the digital attenuation value could be calculated by microcontroller 70 given the number of active channels. The variable digital attenuation value thus provided by microcontroller 70 enables the system to operate the DAC as near to full-scale as possible without clipping for any given number of active channels. This variable attenuation is illustrated in FIGS. 2 and 3 as described below.

FIG. 2 is a diagram showing power control for a single digital signal representing the situation in which only one channel of the embodiment of FIG. 1 is active. A single digital signal 100 is depicted having a maximum amplitude at a predetermined center frequency. The signal amplitude corresponding to the full scale of the DAC is indicated by dashed line 102. As depicted in FIG. 2, the amplitude of digital signal 100 is adjusted so that it is close to but does not exceed the DAC full scale amplitude 102, thus operating the DAC at a minimum "backoff" 104. This permits operation of the DAC at maximum power while preventing unwanted clipping of the signal in the DAC when only one channel is active.

FIG. 3 is a diagram showing power control for three digital signals, representing the situation in which only three channels of the embodiment of FIG. 1 are active. The digital signals 110, 112, and 114 are depicted each with a maximum amplitude at a different center frequency. The signal amplitude corresponding to the full scale of the DAC is again indicated by dashed line 102. As depicted in FIG. 3, the amplitudes of the three digital signals 110, 112, and 114 are reduced, producing a large "backoff" 116, 118, and 120 for each signal. When combined, the three digital signals will produce a combined signal having peaks of greater amplitude than the individual signal. Thus, the larger backoff is necessary to prevent clipping of the peaks of the combined digital signal by the DAC. However, the amplitudes of the digital signals 110, 112, and 114 should only be reduced the minimum necessary to prevent clipping. This permits operation of the DAC at maximum power while preventing unwanted clipping of the signals in the DAC when the three channels are active. As can be seen from FIGS. 2 and 3 and the description accompanying the drawings, the optimum attenuation of the digital input signals is a function of the number of digital signals being combined for input into the DAC (i.e. the number of active channels in the system).

Returning to FIG. 1, the digital combine circuit 40 may also include a circuit to perform clipping of the combined digital signal before input to the DAC 50 to further enhance the operation of the system. The peaks of the combined digital signal can be clipped by small amounts, typically from about 0.1% to 0.5%, to yield a signal which is negligibly different spectrally, but with a significantly lower peak/RMS ratio. This clipping thus removes the extreme peaks of the combined digital signal without significantly affecting the integrity of the original digital signals. This enables the system to operate with less attenuation of the digital signals, thus improving the accuracy and signal-to-noise ratio of the DAC 50.

The DAC 50 converts the combined digital signal into an analog signal. The use of DACs is well known in the art and suitable DACs are commercially available from several manufacturers. The analog power control circuit 60 receives a control signal from microcontroller 70 and amplifies the analog signal output from DAC 50 according to the control signal. The microcontroller 70 provides control signals for both the digital power control circuits 30, 32, and 34 and the analog power control circuit 60 to control the amount of attenuation of the digital input signals to the DAC and the amount of amplification of the analog output signal from the DAC. The use of microcontrollers is well known in the art and suitable microcontrollers are commercially available from several manufacturers.

Referring now to FIG. 4, a block diagram is shown with details of digital power control circuits 30, 32, and 34 and digital combine circuit 40 of the embodiment of FIG. 1. The following describes power control circuit 30, and it should be understood that power control circuits 32 and 34 have similar structures. The digital power control circuit 30 comprises a register 36 and multiply circuit 38, and the digital combine circuit comprises a summer circuit 42 and compare circuit 44.

The digital power control circuit 30 receives the digital signal generated by signal generator 20 (shown in FIG. 1). The digital signal will typically be in serial format, although digital power control circuit 30 could be readily designed to accept parallel signals. The serial digital signal is read into register 36 to convert the signal to a parallel format in the form of a word of data. The number of bits in the register 36 (and in the data word) equals or exceeds the bit resolution of the DAC, which is typically from 8 to 14 bits in PCS basestation applications. The multiply circuit 38 receives the data word from register 36, and also receives another word representing the digital attenuation value from microcontroller 70. The multiply circuit 38 multiplies the data word from register 36 and the digital attenuation value to produce an attenuated digital signal. It should be noted that the digital attenuation value supplied by the microcontroller will usually result in the amplitude of the digital signal being reduced, although the digital signal could be increased.

Summer circuit 42 receives the output from multiply circuit 38 representing the attenuated digital signal, and also receives the outputs from similar multiply circuits of digital power control circuits 32 and 34. Summer circuit 42 sums all of the inputs from the multiply circuits to produce a combined digital signal for input to the compare circuit 44. Compare circuit 44 receives the combined digital signal from summer circuit 42 and receives another input from microcontroller 70 representing a maximum amplitude value. Compare circuit 44 compares the combined digital signal from summer circuit 42 with the maximum amplitude value from microcontroller 70. If the combined digital signal is less than or equal to the maximum amplitude value, the output from the compare circuit 44 is equal to the input value of the combined digital signal. However, if the combined digital signal is greater than the maximum amplitude value, the output from the compare circuit 44 is limited to the maximum amplitude value. The compare circuit 44 thus performs the clipping function discussed above. The output from the compare circuit 44 is then input to the DAC 50 for conversion from digital format to an analog signal.

FIG. 5 shows details of the analog power control circuit 60 of the embodiment of FIG. 1. The analog power control circuit 60 includes a first stage amplifier 62, a second stage amplifier 64, and a variable attenuator circuit 66. The first stage amplifier 62 and second stage amplifier 64 amplify the analog signal generated by the DAC 50 by a fixed amount. The attenuator circuit 66 receives the amplified analog signal and a control signal from microcontroller 70, and adjusts the amplitude of the amplified analog signal in accordance with the control signal from the microcontroller 70. The first stage amplifier 62, second stage amplifier 64, and variable attenuator circuit 66 may be constructed using components and techniques well known in the art.

Thus, an apparatus and method for power control in a digital to analog converter (DAC) with multiple digital input channels has been described according to the present invention. Many modifications and variations may be made to the techniques and structures described and illustrated herein without departing from the spirit and scope of the invention. Accordingly, it should be understood that the methods and apparatus described herein are illustrative only and are not limiting upon the scope of the invention.

What is claimed is:

1. An apparatus for combining two or more digital signals into one analog signal, each of said digital signals having an amplitude, said apparatus comprising:

two or more digital power control circuits, each digital power control circuit for receiving one of said digital signals and adjusting said amplitude of said one of said digital signals to produce an adjusted digital signal;

a combining circuit for receiving said adjusted digital signals and combining said adjusted digital signals into a combined digital signal, said combined digital signal having an amplitude;

a digital to analog converter for receiving said combined digital signal and converting said combined digital signal into an analog signal, said analog signal having an amplitude;

an analog power control circuit for receiving said analog signal from said digital to analog converter and adjusting said amplitude of said analog signal; and a microcontroller connected to said digital power control circuits and said analog power control circuit for controlling said adjustment of said amplitude of said digital signals and said analog signal.

2. The apparatus of claim 1 wherein each of said digital power control circuits comprise a multiply circuit.

3. An apparatus for combining two or more digital signals into one analog signal, each of said digital signals having an amplitude, said apparatus comprising:

two or more digital power control circuits, each digital power control circuit for receiving one of said digital signals and adjusting said amplitude of said one of said digital signals to produce an adjusted digital signal;

a combining circuit for receiving said adjusted digital signals and combining said adjusted digital signals into a combined digital signal, said combined digital signal having an amplitude;

a digital to analog converter for receiving said combined digital signal and converting said combined digital signal into an analog, signal said analog signal having an amplitude;

an analog power control circuit for receiving said analog signal from said digital to analog converter and adjusting said amplitude of said analog signal; and a microcontroller connected to said digital power control circuits and said analog power control circuit for controlling said adjustment of said amplitude of said digital signals and said analog signal;

wherein each of said digital power control circuits comprise a multiply circuit and each of said multiply circuits receives a respective first adjustment value from said microcontroller and multiplies said first adjustment value and said digital signal to produce said adjusted digital signal.

4. The apparatus of claim 3 wherein said first adjustment values vary according to the number of said digital signals received by said apparatus.

5. The apparatus of claim 4 wherein said first adjustment values vary according to predetermined gains for each of said two or more digital signals.

6. The apparatus of claim 5 wherein the analog power control circuit comprises at least one amplifier and at least one attenuator.

7. The apparatus of claim 6 wherein said attenuator adjusts said amplitude of said analog signal according to a second adjustment value received from said microcontroller.

8. The apparatus of claim 7 wherein said microcontroller comprises a memory for storing said first and second adjustment values.

9. The apparatus of claim 8 wherein said digital signals comprise digital carrier signals, said apparatus generating said analog signal for transmission by a cellular basestation.

10. The apparatus of claim 1 wherein said combining circuit comprises a circuit for clipping said combined digital signal.

11. The apparatus of claim 10 wherein said circuit for clipping comprises a compare circuit for comparing said combined digital signal to a reference value and limiting said amplitude of said combined digital signal if said amplitude of said combined digital signal exceeds said reference value.

12. The apparatus of claim 11 wherein said microcontroller comprises a memory for storing said reference value, said reference value varying according to the number of said digital signals and according to predetermined power levels for each of said digital signals.

13. A method for combining two or more digital signals into one analog signal, each of said digital signals having an amplitude, said method comprising:

processing said digital signals to produce an adjustment of said amplitudes of said digital signals according to first adjustment values provided by a microcontroller;

combining said processed digital signals into a combined digital signal;

converting said combined digital signal into an analog signal, said analog signal having an amplitude; and adjusting said amplitude of said analog signal according to a second adjustment value.

14. The method of claim 13 wherein said first adjustment values vary according to the number of digital signals being combined.

15. The method of claim 14 wherein said first and second adjustment values are provided by a microcontroller.

16. The method of claim 15 wherein said processing step comprises multiplying said digital signals and said first adjustment values to produce said adjustment to said amplitude of said digital signals.

17. The method of claim 16 further comprising a clipping step after said combining step and before said converting step, said clipping step comprising comparing said combined digital signal to a reference value and limiting said amplitude of said combined digital signal if said amplitude of said combined digital signal exceeds said reference value.

18. The method of claim 17 wherein said first adjustment values and said reference value vary according to the number of digital signals being combined.

19. The method of claim 18 wherein said first and second adjustment values and said reference value are provided by a microcontroller.

20. The method of claim 19 wherein said digital signals comprise digital carrier signals and further comprising transmitting said adjusted analog signal in a cellular telecommunication network.

* * * * *